United States Patent
Santra et al.

(10) Patent No.: US 12,054,665 B2
(45) Date of Patent: Aug. 6, 2024

(54) SYNTHESIS AND USE OF GRAFTED GRAPHENE IN AQUEOUS DRILLING FLUIDS AS LOW SHEAR RATE VISCOSITY ENHANCER

(71) Applicant: ARAMCO SERVICES COMPANY, Houston, TX (US)

(72) Inventors: Ashok Santra, The Woodlands, TX (US); Carl Thaemlitz, Cypress, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/647,416

(22) Filed: Jan. 7, 2022

(65) Prior Publication Data
US 2023/0235209 A1 Jul. 27, 2023

(51) Int. Cl.
*C09K 8/12* (2006.01)
*C08F 292/00* (2006.01)
*E21B 21/00* (2006.01)

(52) U.S. Cl.
CPC .............. *C09K 8/12* (2013.01); *C08F 292/00* (2013.01); *E21B 21/00* (2013.01); *C09K 2208/10* (2013.01)

(58) Field of Classification Search
CPC ..................................................... C09K 8/032
See application file for complete search history.

(56) References Cited

U.S. PATENT DOCUMENTS

| | | | |
|---|---|---|---|
| 8,183,180 B2 | 5/2012 | Tour et al. | |
| 2011/0059871 A1* | 3/2011 | Tour ..................... | C09K 8/035 507/140 |
| 2012/0129736 A1* | 5/2012 | Tour ..................... | B82Y 30/00 977/734 |
| 2012/0245058 A1* | 9/2012 | Monteiro ............. | C09K 8/032 507/131 |
| 2016/0340570 A1* | 11/2016 | Salla ..................... | C09K 8/516 |
| 2020/0063027 A1* | 2/2020 | Chopade ............... | C09K 8/82 |

FOREIGN PATENT DOCUMENTS

| | | |
|---|---|---|
| EP | 2 245 104 A2 | 11/2010 |
| WO | 2014/060686 A1 | 4/2014 |

OTHER PUBLICATIONS

Wu, Hao et al., "Janus graphene oxide nanosheets prepared via Pickering emulsion template"; Carbon; vol. 93; pp. 473-483; Nov. 2015 (33 pages).
De Leon, AI C. et al., "Distinct Chemical and Physical Properties of Janus Nanosheets"; ACS NANO; vol. 11, Issue 7; pp. 7485-7493; Jul. 11, 2017 (9 pages).

* cited by examiner

*Primary Examiner* — William D Hutton, Jr.
*Assistant Examiner* — Avi T Skaist
(74) *Attorney, Agent, or Firm* — Osha Bergman Watanabe & Burton LLP

(57) ABSTRACT

A composition that includes a polymer-grafted graphene particle and aqueous-based drilling fluid is provided. At least one side of the graphene particle comprises a grafted polymer. A method of using an aqueous-based drilling fluid is also provided. The method includes introducing the aqueous-based drilling fluid into a wellbore and circulating the aqueous-based drilling fluid during drilling operations. The drilling fluid includes a polymer-grafted graphene particle and aqueous-based drilling fluid. At least one side of the graphene particle comprises a grafted polymer. The aqueous-based drilling fluid includes a range of from about 0.01 ppb to 10 ppb of the polymer-grafted graphene particle.

8 Claims, No Drawings

SYNTHESIS AND USE OF GRAFTED GRAPHENE IN AQUEOUS DRILLING FLUIDS AS LOW SHEAR RATE VISCOSITY ENHANCER

BACKGROUND

During drilling operations, a drilling fluid, which may also be referred to as drilling mud, is circulated through the wellbore to cool and lubricate the drill bit, to convey rock cuttings to the surface, and to support the wellbore against collapse and intrusion of fluids from the formation, among other purposes. Drilling fluids are formulated to have certain fluid characteristics, such as density and rheology, for example, that allow the drilling fluid to perform these functions. When circulation stops, the drill cuttings must remain suspended in the fluid. Under certain extreme downhole conditions, such as excessive temperature, for example, some of the properties of the drilling fluid may be altered.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect embodiments disclosed herein relate to a composition that includes a polymer-grafted graphene particle and aqueous-based drilling fluid. At least one side of the graphene particle comprises a grafted polymer.

In another aspect, embodiments disclosed herein relate to a method of using an aqueous-based drilling fluid. The method includes introducing the aqueous-based drilling fluid into a wellbore and circulating the aqueous-based drilling fluid during drilling operations. The drilling fluid includes a polymer-grafted graphene particle and aqueous-based drilling fluid. At least one side of the graphene particle comprises a grafted polymer. The aqueous-based drilling fluid includes a range of from about 0.01 ppb to 10 ppb of the polymer-grafted graphene particle.

Other aspects and advantages of the claimed subject matter will be apparent from the following description and the appended claims.

DETAILED DESCRIPTION

Rheological properties of drilling fluids are important for safely and effectively drilling a well. Drilling fluid must be capable of maintaining good rheological properties under extreme environments, such as elevated temperature and pressure. An important rheological property of drilling fluid is yield point. A high yield point implies a non-Newtonian fluid. Fluids with higher yield points are better able to carry drill cuttings to the surface and keep formation cuttings suspended in the drilling fluid when circulation is paused. The present disclosure relates to a drilling fluid composition including a polymer grafted graphene particle. Disclosed compositions may provide increased yield point as compared to compositions that do not include polymer grafted graphene particles.

Polymer Grafted Graphene Particle

One or more embodiments include polymer-grafted graphene particles that include graphene. The graphene used to form the one or more embodiment particles may have a hexagonal crystal structure. Graphene typically has a bulk density of from about 0.03 to about 1.0 $g/cm^2$ (grams per centimeter squared).

Graphene used for one or more embodiments may be an appropriate size for use as part of a water-based drilling fluid or "mud". For example, the graphene may have a thickness in a range of from about 0.5 to 20 nm (nanometers), a length in a range of from about 0.5 to 50 µm (micrometers), and a width in a range of from about 0.5 to 50 µm; however, this may vary according to the needs of the application.

Graphene used for one or more embodiments may be an appropriate shape for use in an aqueous-based drilling fluid. For example, graphene particles may be flat or non-flat sheets that are in common geometric shapes, such as circular, square, and triangular forms. Geometric and non-geometric configurations are not limited except as to provide for a surface for grafting with a polymer.

Graphene used for embodiment particles may have appropriate surface chemistry for use as in water-based muds. In some embodiments, the graphene surface is hydrophobic, meaning the graphene surface has a water contact angle of greater than 90°.

Embodiment polymer-grafted graphene particles also include a polymer that is grafted to at least one side of the graphene particle. In embodiments in which a polymer is grafted to one side of the graphene particle and the other side of the graphene particle does not include a polymer, the particle may be referred to as a "mono-facial polymer grafted graphene particle". In such embodiments, graphene particles have a "Janus-like" structure due to the difference in functionality of the polymer-grafted side and the graphene side. In embodiments in which both sides of the graphene particle are grafted with a polymer (i.e., a first side and a second side), the particle may be referred to as a "bi-facial polymer grafted graphene particle".

The grafted polymers may be made from any suitable monomer that is configured to graft to a graphene particle and provide sufficient hydrophilicity for use in aqueous-based drilling fluid. The polymer may be formed by grafting a monomer unit to a graphene oxide surface and polymerizing one or more types of monomers together to form a polymer. A monomer reacts with the surface of graphene oxide to form a grafted monomer unit. Additional monomer units then add to the grafted monomer unit to form a grafted polymer. The length of the polymer may be formed from a polymerization reaction of from about 5 monomer units to about 200 monomer units. The polymers formed are hydrophilic, so they are suitable for use in water-based muds. Polymers may include any suitable molecular structure, such as linear, branched, random, alternating, block, and grafted.

Suitable monomers may include but are not limited to 2-acrylamido-2-methylpropane sulfonic acid (AMPS), N,N-dimethylacrylamide (NNDMA), acrylic acid amide (AM), acrylic acid (AA), itaconic acid (IA), dimethylacrylamide (DMA), styrene, and combinations thereof. Polymers may be formed from a single type of monomer or from multiple monomer types. In one embodiment, the polymer may include units of a single monomer type. In another embodiment, the polymer may include units of a first monomer type and second monomer type. In yet another embodiment, the polymer may include units of a first monomer type, second monomer type, and a third monomer type.

In embodiments in which two different monomers are used (also referred to as a copolymer), the copolymer may include from 30-70 mol % of units derived from a first monomer and from 30 to 70% of units derived from a second monomer. In particular embodiments, the copolymer may include about 50 mol % of units derived from the first monomer and 50 mol % of units derived from the second monomer.

In embodiments in which three different monomers are used (also referred to as a terpolymer), the terpolymer may include from 30 to 60 mol % of units derived from a first monomer, from 30 to 60 mol % of units derived from a second monomer and 1 to 10 mol % of units derived from a third monomer. In particular embodiments, the terpolymer may include about 45 mol % of units derived from the first monomer, about 45 mol % of units derived from the second monomer, and about 10 mol % of units derived from the third monomer.

A combination of different monomers may be used in order to provide certain properties. For example, some monomers, such as AMPS, provide salinity tolerance. Other monomers, such as styrene, provide high temperature tolerance. Thus, using a combination of AMPS and styrene may provide a combination of tolerance to high salinity and temperature. Generally, monomers disclosed herein result in a hydrophilic polymer that is suitable for use in aqueous-base muds.

In a non-limiting exemplary embodiment, the polymer may be a copolymer including units derived from AA monomers and units derived from AMPS monomers. In another non-limiting exemplary embodiment, the polymer may be a copolymer including units derived from AMPS monomers and units derived from NNDMA monomers. In embodiments in which a terpolymer is used, any of the previously described comonomers may further include styrene or IA monomers, which may improve thermal stability.

Method of Making Mono-Facial Polymer Grafted Graphene Particle

One or more embodiments relate to a method of making a mono-facial polymer-grafted graphene particle. One or more embodiments may include preparing an emulsion, adding one or more monomers to the emulsion, initiating polymerization, and polymerizing the monomer(s) to form the embodiment mono-facial polymer-grafted graphene particle.

Embodiment methods may include preparing an emulsion. The preparing step may include mixing water, wax, and graphene oxide, at an elevated temperature, and agitating the mixture to form an emulsion. The term "elevated temperature" means a temperature that is greater than room temperature. The elevated temperature for preparing the emulsion is not particularly limited provided that the elevated temperature is in a range that is greater than the melting temperature of the wax and is less than the boiling point of water. In some embodiments, the temperature is in a range of from about 60 to 90° C.

In preparing the emulsions, appropriate amounts of water and graphene oxide are mixed and agitated, creating a slurry. Such agitation may include stirring, sonication, and other suitable agitation methods, to distribute the graphene oxide particles homogenously throughout the water. Then, wax may be added to the graphene/water slurry to create a second slurry—a wax-in-water slurry. The wax may be added gradually as a solid. In one or more embodiments, as the solid wax particles heats, the molten wax droplets form. In such instances, the molten wax droplets may have a diameter of from about 0.05 to 100 μm (micrometers or microns). The second slurry may be agitated to form an emulsion of wax in water with graphene oxide particles.

The emulsions may comprise water in a range of from about 50 to 85 wt % (weight percent), graphene oxide in a range of from about 10 to 30 wt %, and wax in a range of from about 10 to 35 wt %. The amounts of water, graphene oxide, and wax may be adjusted to achieve a desired droplet size of the molten wax in the slurry.

In one or more embodiments, an acid, such as hydrochloric acid, may be present in an amount in a range of from about 0.03 to 0.1 wt % of the emulsion as compared to the mass of water. The HCl is used to adjust the pH of the emulsion to a range of about 2 to 3.

During the emulsification of the second slurry, graphene oxide collects at the interface of the water and the molten wax, forming a Pickering emulsion. The graphene oxide has wax affiliated with one of its two opposing surfaces; water with the other. Once the Pickering emulsion has formed, the emulsion may then be cooled such that the wax droplets re-solidify. Upon solidification, the wax particles (formerly droplets) are coated in the graphene oxide particles; the graphene particles are attached to the surface of the wax. The wax particles coated with graphene oxide particles may be separated from the water using known means in the art, such as by filtration.

The wax/graphene oxide particles may be dispersed in a solution of sodium hydroxide at a pH of about 10, agitated for about 5 to 10 minutes, filtered, and recovered.

Embodiment methods include forming a suspension with the previously separated wax/graphene oxide particles. The wax/graphene oxide particles may be suspended in a solution of equal parts water and ethanol by weight. Into the suspension an amount of monomer and initiator is added. The weight ratio of graphene:monomer may be in a range of from about 1:1 to about 1:20. Suitable initiators may include, but are not limited to, α-bromoisobutyryl bromide (referred to here as "ATRP") and trithiocarbonates (referred to here as "RAFT agents"). The initiator may be included in an amount ranging from about 2 to 15 mol % (mole percent) based on the amount of monomer(s). In embodiments in which a copolymer is being synthesized, about a 1:1 molar ratio of monomers may be used. In embodiments in which a terpolymer is being synthesized, about a 4.5:4.5:1 molar ratio of a first, second and third monomer may be used.

Once a monomer(s) and initiator are added, the suspension is stirred for a period in a range of from about 5 to 24 hours at a temperature of in a range of from about 30 to 90° C. to facilitate polymerization on the non-wax side of the graphene particle. Polymerization generally does not occur at a temperature that would melt the wax particles. The rate of polymerization may be increased by utilizing increased reaction temperatures. The reaction time typically does not control the length of the polymer chains. The length of the polymer chains is determined by the amount of monomer(s) added to the suspension.

Once polymerization is complete, mono-facial polymer grafted graphene particles have formed. In order to recover the embodiment mono-facial polymer grafted graphene particles from the surface of the wax particles, the wax particles are heated to a temperature greater than the melting point of the wax, generally in a range of from about 60 to about 95° C. The embodiment mono-facial polymer-grafted graphene particle is separated via filtration. The embodiment particles may be rinsed with warm water to remove residual wax from the non-polymerized size of the particle. The embodiment mono-facial polymer grafted graphene particles may be stored as a powder.

Method of Making Bi-Facial Polymer Grafted Graphene Particle

One or more embodiments relate to a method of making a bi-facial polymer-grafted graphene particle. One or more embodiments may include preparing dispersion of graphene oxide, adding one or more monomers to the dispersion, initiating polymerization, and polymerizing the monomer(s) to form the embodiment bi-facial polymer-grafted graphene particle.

Embodiment methods may include preparing a dispersion of graphene oxide in a solvent. The preparing step may include adding an appropriate amount of solid graphene oxide to a solvent such as dimethylformamide (DMF) to create a dispersion. The dispersion may then be agitated, such as by sonication, to exfoliate the graphene oxide into individual sheets. After agitating the dispersion, aggregated graphene oxide is removed by centrifugation while exfoliated graphene oxide remain dispersed in the DMF.

Polymerization of the graphene oxide is conducted in a manner similar to the previously described process for mono-facial graphene particles. An amount of monomer and initiator is added to the dispersion of graphene oxide in DMF. The weight ratio of graphene:monomer(s) may be in a range of from about 1:1 to about 1:20. Suitable initiators may include, but are not limited to, α-bromoisobutyryl bromide (referred to here as "ATRP") and trithiocarbonates (referred to here as "RAFT agents"). The initiator may be included in an amount ranging from about 2 to 15 mol % (mole percent) based on the amount of monomer(s). If co- or terpolymers are being made, ratios of each of the monomers may be as previously described.

Once a monomer(s) and initiator are added, the dispersion is stirred for a period in a range of from about 5 to 24 hours at a temperature of in a range of from about 30 to 90° C. to facilitate polymerization. The rate of polymerization may be increased by utilizing increased reaction temperatures. The reaction time typically does not control the length of the polymer chains. The length of the polymer chains is determined by the amount of monomer(s) added to the suspension.

Once polymerization is complete, bi-facial polymer grafted graphene particles have formed. The particles may be filtered from the solvent and stored as a powder.

In an exemplary embodiment, about 2.5 g of graphene oxide may be dispersed in about 1 L of DMF by ultrasonication for 2 hours in an ice batch to avoid heat generation. The dispersed suspension may be transferred to a 2 L round bottom flask equipped with magnetic stirring. Then 10 mL of trimethylamine (TEA) may be added and the solution stirred for 10 minutes. 40 mL of ATRP may be diluted with DMF and added dropwise to the GO suspension in ice bath. After stirring in ice bath for 1 hour, the reaction may be allowed to age at room temperature for 3 days. The resulted product may be purified by centrifugation at 4.4 krpm for 10 min to remove the DMF. The precipitate may be washed three times with reagent alcohol for 3 times with centrifugation. Then the final product may be dried under vacuum at 50° C. to remove solvent for 2 days.

An Aqueous-Based Drilling Fluid with Polymer Grafted Graphene Particle

In another aspect, embodiments disclosed relate to a composition of matter of an aqueous-base drilling fluid with the previously described polymer-grafted graphene particle.

One or more embodiments of the drilling fluid include an aqueous-base fluid. The aqueous-based fluid includes water. The water may be distilled water, deionized water, tap water, fresh water from surface or subsurface sources, production water, formation water, natural and synthetic brines, brackish water, natural and synthetic sea water, black water, brown water, gray water, blue water, potable water, non-potable water, other waters, and combinations thereof, that are suitable for use in a wellbore environment. In one or more embodiments, the water used may naturally contain contaminants, such as salts, ions, minerals, organics, and combinations thereof, as long as the contaminants do not interfere with the operation of the drilling fluid.

The one or more embodiments, the drilling fluid may contain water in a range of from about 50 wt % to 97 wt % based on the total weight of the drilling fluid. In one or more embodiments, the embodiment drilling fluid may comprise greater than 70 wt % water based on the total weight of the drilling fluid.

In one or more embodiments, the water used for the drilling fluid may have an elevated level of salts or ions versus fresh water, such as salts or ions naturally-present in formation water, production water, seawater, and brines. In one or more embodiments, salts or ions are added to the water used to increase the level of a salt or ion in the water to effect certain properties, such as density of the drilling fluid or to mitigate the swelling of clays that come into contact with the drilling fluid. Without being bound by any theory, increasing the saturation of water by increasing the salt concentration or other organic compound concentration in the water may increase the density of the water, and thus, the drilling fluid. Suitable salts may include, but are not limited to, alkali metal halides, such as chlorides, hydroxides, or carboxylates. In one or more embodiments, salts included as part of the aqueous-based fluid may include salts that disassociate into ions of sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, and fluorides, and combinations thereof. Without being bound by any theory, brines may be used to create osmotic balance between the drilling fluid and portions of the subterranean formation, such as swellable clays.

In one or more embodiments, the drilling fluid may comprise one or more salts in an amount that ranges from about 1 to about 300 ppb (pounds per barrel). For example, the drilling fluid may contain the one or more salts in an amount ranging from a lower limit of any of 1, 10, 50, 80, 100, 120, 150, 180, 200, 250 and 280 ppb, to an upper limit of any of 20, 30, 40, 50, 70, 100, 120, 150, 180, 200, 220, 240, 260, 280 and 300 ppb, where any lower limit can be used in combination with any mathematically-compatible upper limit.

In one or more embodiments, the drilling fluid may comprise a suitable amount of the previously described polymer-grafted graphene particle to increase yield point and low shear yield point of the drilling fluid. In one or more embodiments, the polymer-grafted graphene particle is present embodiment drilling fluid in a range of from about 0.01 ppb to 10 ppb. For example, the drilling fluid may contain the polymer-grafted graphene particle in an amount ranging from a lower limit of any of 0.01, 0.05, 0.10, 0.25, 0.5, 1.0, 1.5 and 2.0 ppb, to an upper limit of any of 2.5, 3.0, 3.5, 4.0, 4.5, 5.0, 6.0, 7.0, 8.0, 9.0, and 10.0 ppb, where any lower limit can be used in combination with any mathematically-compatible upper limit.

In one or more embodiments, the drilling fluid may include at least one pH adjuster. The pH adjuster may be at least one alkali compound. Examples of alkali compounds may include, but are not limited to, lime (calcium hydroxide, calcium oxide, or a mixture thereof), soda ash (sodium carbonate), sodium hydroxide, potassium hydroxide, and combinations thereof. The alkali compounds may react with gases, such as $CO_2$ or $H_2S$ (also known as acid gases), encountered by the drilling fluid composition during drilling operations and prevent the gases from hydrolyzing components of the drilling fluid composition. Some embodiment drilling fluid compositions may include a pH adjuster in a range of from about 0.01 wt % to about 0.7 wt %, such as from 0.01 wt % to 0.5 wt %, from 0.01 wt % to 0.3 wt %, from 0.01 wt % to 0.1 wt %, from 0.01 wt % to 0.05 wt %, from 0.05 wt % to 0.7 wt %, from 0.05 wt % to 0.5 wt %, from 0.05 wt % to 0.3 wt %, from 0.05 wt % to 0.1 wt %, from 0.1 wt % to 0.7 wt %, from 0.1 wt % to 0.5 wt %, from 0.1 wt % to 0.3 wt %, from 0.3 wt % to 0.7 wt %, from 0.3 wt % to 0.5 wt %, and from 0.5 wt % to 0.7 wt % pH adjuster, based on the total weight of the drilling fluid composition. In one or more embodiments, the drilling fluid compositions may optionally include from 0.01 ppb to 10 ppb of at least one pH adjuster based on the total volume of the drilling fluid composition.

Embodiment drilling fluids may have a neutral or alkaline pH. In one or more embodiments, the drilling fluid may have a pH ranging from about 7, 7.5, 8, 8.5, 9, 9.5, and 10, to about 7.5, 8, 8.5, 9, 9.5, 10, 10.5, and 11, where any lower limit may be combined with any mathematically feasible upper limit.

In one or more embodiments, the drilling fluid may include weighting agents, which may be dispersed in the drilling fluid. The solids may be finely divided and have a specific gravity (SG) that when added to an aqueous-based fluid increases the density of the drilling fluid. Examples of suitable weighting materials include, but are not limited to, barite (minimum SG of 4.20), hematite (minimum SG of 5.05), calcium carbonate (minimum SG of 2.7-2.8), siderite (minimum SG of 3.8), ilmenite (minimum SG of 4.6), magnesium tetroxide (minimum SG of 4.8), and combinations thereof.

The embodiment drilling fluid may include an amount of weighting material sufficient to increase the density of the drilling fluid composition to support the wellbore and prevent fluid intrusion. In one or more embodiments, the drilling fluid composition may include weighting material in a range of from about 1 wt % to about 30 wt % based on the total weight of the drilling fluid composition. For example, the drilling fluid may contain weighting agents in an amount ranging from about 1 ppb to about 700 ppb, such as from about 10 to about 650 ppb, from about 50 ppb to about 700 ppb, or from about 100 ppb to about 600 ppb, or from about 200 ppb to about 500 ppb.

In one or more embodiments, the drilling fluid may have a density in a range of from about 62 pounds cubic foot (pcf) to about 170 pcf as measured using Fann Model 140 Mud Balance according to ASTM Standard D4380. For instance, the drilling fluid may have a density in a range of from about 63 pcf to about 150 pcf, from 65 pcf to 140 pcf, from 70 pcf to 160 pcf, from 80 pcf to 150 pcf, from 90 pcf to 140 pcf, from 100 pcf to 160 pcf, from 70 pcf to 150 pcf, from 70 pcf to 100 pcf, and from 120 pcf to 160 pcf. The drilling fluid may have a density that is greater than or equal to 62 pcf, such as greater than or equal to 70 pcf, and such as greater than or equal to 100 pcf.

Embodiment drilling fluids comprising the polymer-grafted graphene particle may have improved properties as compared to drilling fluids without the polymer-grafted graphene particle. Such improvements may include an increased yield point (YP) and low shear yield point (LSYP) across a range of temperatures and pressures.

In one or more embodiments, drilling fluids comprising the polymer-grafted graphene particle may have an improvement in yield point of at least 25%, at least 30%, at least 50%, at least 60%, at least 75%, at least 85% or at least 100% as compared to a control drilling fluid that does not have graphene. In one or more embodiments, drilling fluids comprising the polymer-grafted graphene particle may have an improvement in yield point of at least 25%, at least 30%, at least 50%, at least 60%, at least 75%, at least 85% or at least 100% as compared to a control drilling fluid that includes unmodified graphene.

While the present disclosure describes using polymer-grafted graphene particles in drilling fluids, the disclosed particles may be used in a variety of fluids in oil and gas applications. As may be appreciated by those skilled in the art, embodiment polymer-grafted graphene particles may be useful in completion fluids, workover fluids, spacer fluids, cement compositions and others.

Method of Using an Aqueous-Based Drilling Fluid with Polymer Grafted Graphene Particle One or more embodiments of the present disclosure related to using the previously described aqueous-based drilling fluid having a polymer grafted graphene particle in a hydrocarbon bearing formation. Embodiment methods include introducing the previously described aqueous-based drilling fluid into a wellbore and then circulating the aqueous-based drilling fluid in the wellbore during drilling operations.

EXAMPLES

All materials had a purity of 99% or greater and were used as received unless otherwise indicated.

Preparation of Bifacial GO-AMPS-r-AA

GO-ATRP (5 g) was dispersed in DMF (1 L) by ultra-sonication for 2-3 hours with ice bath cooling to make sure it dispersed well in DMF. AMPS monomer (100 g) was dissolved in 200 mL water. A 1:1 molar ratio of AA (35 g) was added to the solution. The solution was neutralized with sufficient amount of sodium hydroxide until the pH was higher than 7. Then the water solution was mixed with the DMF suspension and 1.5 g of copper(I) bromide was added to the mixed solution and transferred to a 2 L round bottom flask equipped with septum and magnetic stirrer. Then the solution was purged with nitrogen for one hour to remove oxygen in the system. 12 mL PMTEMA (N,N,N',N'',N''-Pentamethyldiethylenetriamine) was added by syringe and the flask was placed in an oil bath preheated to 80° ° C. The PMTEMA is an ATRP ligand that was used to stabilize copper ions during the polymerization process. The reaction was allowed to proceed at 80° ° C. for 2-3 days. The raw product was centrifuged at 4.4 krpm for 10 minutes to remove the solvent and then washed with reagent alcohol at least 3 times until no blue color was present in the supernatant. Then the sediment GO-AMPS-r-AA was dried under vacuum at 50° C. for 2 days (the "r" indicates a random polymer). The resultant product was used to prepare mud samples #3 and #4 in Table 1.

Preparation of Bifacial GO-AMPS-r-DMA

GO-ATRP (5 g) was dispersed in DMF (1 L) by ultra-sonication for 2-3 hours with ice bath cooling to make sure it dispersed well in DMF. AMPS monomer (100 g) was dissolve in 200 mL water. The solution was neutralized with a sufficient amount of sodium hydroxide until the pH is higher than 7. Then the water solution was mixed with the DMF suspension and 1.5 g of copper(I) bromide was added to the mixed solution. A 1:1 molar ratio of DMA (50 g) was added to the solution and transferred to a 2 L round bottom flask equipped with septum and magnetic stirred. Then the solution was purged with nitrogen for one hour to remove oxygen in the system. 12 mL PMTEMA was added by syringe and the flask was placed in an oil bath preheated to 80° C. The reaction was allowed to proceed for 2-3 days. The raw product was centrifuged at 4.4 krpm for 10 minutes to remove the supernatant, and then washed with reagent alcohol at least 3 times until no color was visible in the supernatant. Then the sediment GO-AMPS-r-DMA was dried under vacuum at 50° C. for 2 days (the "r" indicates a random polymer). The resultant product was used to prepare samples #5 and #6 in Table 1.

Aqueous mud samples were prepared in a Hamilton beach multi-mixer. Unless otherwise specified, a mixing speed of 12,000 rpm (revolutions per minute) was used. Each sample was prepared by starting with water and then adding each of the components listed in Table 1, followed by the amount of stirring time indicated for that component in Table 1.

The aqueous-based mud samples including the mass (grams) of each mud component is shown in Table 1. Sample #1 is a mud sample having no graphene additive and sample #2 is a mud sample having unmodified graphene. Thus, samples 1 and 2 serve as comparative examples. Samples 3-6 are inventive compositions.

TABLE 1

| Graphene additive Sample Number | Mixing time | Control #1 | Graphene Oxide (unmodified) #2 | GO-AMPS-AA #3 | GO-AMPS-AA #4 | GO-AMPS-DMA #5 | GO-AMPS-DMA #6 |
|---|---|---|---|---|---|---|---|
| Fresh Water | | 287 | 287 | 287 | 287 | 287 | 287 |
| Graphene Additive | Sonicate, 2 hours | 0 | 1 | 0.5 | 1 | 0.5 | 1 |
| Bentonite | 30 min, 12000 RPM | 3 | 3 | 3 | 3 | 3 | 3 |
| Soda Ash | 2 min, 12000 RPM | 0.23 | 0.23 | 0.23 | 0.23 | 0.23 | 0.23 |
| Fluid loss control additive | 5 min, 12000 RPM | 2 | 2 | 2 | 2 | 2 | 2 |
| Caustic soda | 2 min, 12000 RPM | 0.12 | 0.12 | 0.12 | 0.12 | 0.12 | 0.12 |
| Viscosifier | 5 min, 12000 RPM | 0 | 0 | 0 | 0 | 0 | 0 |
| Barite | 2 min, 12000 RPM | 234 | 234 | 234 | 234 | 234 | 234 |

After mixing, all muds were hot-rolled at 300° F. under 500 psi of nitrogen pressure for 16 hours. Then the samples were tested at 120 °F with Fann 35 Rheometer in accordance with the American Petroleum Institute (API) Bulletin 13D. The results of the rheology testing are shown in Table 2, below.

| Sample | 1 | 2 | 3 | 4 | 5 | 6 |
|---|---|---|---|---|---|---|
| RPM | 112 | 130 | 113 | 170 | 150 | 205 |
| 600 | 82 | 90 | 73 | 131 | 115 | 157 |
| 300 | 66 | 69 | 54 | 105 | 98 | 132 |
| 200 | 66 | 69 | 54 | 105 | 98 | 132 |
| 100 | 46 | 43 | 33 | 72 | 70 | 101 |
| 6 | 8 | 7 | 4 | 13 | 14 | 49 |
| 3 | 5 | 4 | 2 | 9 | 10 | 46 |
| 10 s | 6 | 6 | 3 | 12 | 11 | 42 |
| 10 min | 9 | 20 | 12 | 28 | 14 | 45 |
| PV (cP) | 30 | 40 | 40 | 39 | 35 | 48 |
| YP (lb/100 ft$^2$) | 52 | 50 | 33 | 92 | 80 | 109 |
| LSYP (lb/100 ft$^2$) | 2 | 1 | 0 | 5 | 6 | 43 |
| % improvement in YP over control | N/A | −3.8% | −37% | 77% | 53% | 110% |

As shown in Table 2, samples 4, 5 and 6 all had higher yield point and higher low shear yield point values as compared to the control samples 1 and 2. While sample 3 did not provide an improvement in yield point or low shear yield point, this may be due to the presence of AA units in low concentration. AA is a charged species on the polymer and is a known dispersant. At low concentration, the dispersive effects may dominate, while at sufficiently high amounts (such as sample 4), properties such as yield point and low shear yield point are improved.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to +10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Thus, particular implementations of the subject matter have been described. Other implementations are within the scope of the following claims Although only a few example embodiments have been described in detail, those skilled in the art will readily appreciate that many modifications are possible in the example embodiments without materially departing from the scope of the disclosure. Accordingly, all such modifications are intended to be included within the scope of this disclosure as defined in the following claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims, except for those in which the claim expressly uses the words 'means for' together with an associated function.

What is claimed:

1. A composition of matter comprising:
   a polymer-grafted graphene particle, wherein at least one side of the graphene particle comprises a grafted polymer; and
   aqueous-based drilling fluid,
   wherein:
   the grafted polymer consists of:
      units of a first monomer that are 2-acrylamido-2-methylpropane sulfonic acid, and
      units of a second monomer selected from the group consisting of N,N-dimethylacrylamide, acrylic acid amide, acrylic acid, itaconic acid, dimethylacrylamide, styrene, and combinations thereof, and
   a length of the grafted polymer is 5 monomer units to 200 monomer units.

2. The composition of claim 1, wherein a first side and a second side of the graphene particle comprise the grafted polymer.

3. The composition of claim 1, comprising a range of from about 0.01 ppb to 10 ppb of the polymer-grafted graphene particle.

4. The composition of claim 1, comprising an improvement in yield point of at least 50% as compared to a control that does not include the polymer-grafted graphene particle.

5. The composition of claim 1, comprising an improvement in yield point of at least 75% as compared to a control that does not include the polymer-grafted graphene particle.

6. The composition of claim 1, wherein the units of the second monomer are styrene.

7. The composition of claim 1, wherein the units of the second monomer are N,N-dimethylacrylamide.

8. The composition of claim 1, wherein the units of the second monomer consist of styrene and itaconic acid.

* * * * *